(12) United States Patent
Berdel

(10) Patent No.: US 12,533,399 B2
(45) Date of Patent: Jan. 27, 2026

(54) COMPOSITION COMPRISING tTF-NGR FOR USE IN TREATING SOFT-TISSUE SARCOMA

(71) Applicant: ANTUREC PHARMACEUTICALS GMBH, Frankfurt am Main (DE)

(72) Inventor: Wolfgang E. Berdel, Münster (DE)

(73) Assignee: ANTUREC PHARMACEUTICALS GMBH, Frankfurt am Main (DE)

( * ) Notice: Subject to any disclaimer, the term of this patent is extended or adjusted under 35 U.S.C. 154(b) by 405 days.

(21) Appl. No.: 18/042,793

(22) PCT Filed: Aug. 23, 2021

(86) PCT No.: PCT/EP2021/073234
§ 371 (c)(1),
(2) Date: Feb. 24, 2023

(87) PCT Pub. No.: WO2022/043245
PCT Pub. Date: Mar. 3, 2022

(65) Prior Publication Data
US 2023/0321205 A1    Oct. 12, 2023

(30) Foreign Application Priority Data
Aug. 26, 2020 (EP) .................................... 20192984

(51) Int. Cl.
A61K 38/48 (2006.01)
A61K 31/4995 (2006.01)
A61P 35/00 (2006.01)

(52) U.S. Cl.
CPC ........ *A61K 38/488* (2013.01); *A61K 31/4995* (2013.01); *A61P 35/00* (2018.01)

(58) Field of Classification Search
CPC .... A61K 38/488; A61K 31/4995; A61P 35/00
See application file for complete search history.

(56) References Cited

U.S. PATENT DOCUMENTS 7,618,943 B2 * 11/2009 Berdel .................... A61P 35/02
514/19.5
2007/0032419 A1  2/2007 Berdel et al.
2015/0231134 A1 * 8/2015 Erichsen ................. A61P 43/00
514/250

FOREIGN PATENT DOCUMENTS

CN          1871258     11/2006
WO       2007062413      5/2007

OTHER PUBLICATIONS

International Search Report and Written Opinion in corresponding PCT/EP2021/073234, dated Dec. 23, 2021.

Bieker, et al., "Infarction of tumor vessels by NGR-peptide-directed targeting of tissue factor:experimental results and first-in-man experience", Blood, 2009, 113(20), pp. 5019-5027.
Stucke-Ring, et al., "Combinatorial effects of doxorubicin and retargeted tissue factor by intratumoral entrapment of doxorubicin and proapoptotic increase of tumor vascular infarction", Oncotarget, 2016, 7(50), pp. 82458-82472.
Schliemann, et al., :First-In-Class CD13-Targeted Tissue Factor tTF-NGR in Patients with Recurrent or Refractory Malignant Tumors: Results of a Phase I Dose-Escalation Study, Cancers, 2020, 12(6), p. 1488.
Search Report in corresponding European Patent Application Serial No. EP20192984.1, dated Oct. 2, 2021.
Denekamp, et al., "Endothelial-Cell proliferation in experimental tumours", Br. J. Cancer, 1982, 46,pp. 711-720.
De Sanctis, et al., "Efficacy of trabectedin in advanced soft tissue sarcoma: beyond lipo- and leiomyosarcoma", Drug Design, Develop. and Therapy, 2015, 9, pp. 5785-5791.
Kessler, et al., "Aminopeptidase N (CD13): expression, prognostic impact, and use as therapeutic target for tissue factor induced tumor vascular infarction in soft tissue sarcoma", Translational Oncol., 2018, 11(6), pp. 1271-1282.
Guzman-Rojas, et al., "Cooperative effects of aminopeptidase N (CD13) expressed by nonmalignant and cancer cells within the tumor microenvironment", PNAS, 2012, 109(5), pp. 1637-1642.
Huang, et al., "Tumor Infarction in Mice by Antibody-Directed Targeting of Tissue Factor to Tumor Vasculature", Science, 1997, 275(5299), pp. 547-550.
Pasqualini, et al., "Aminopeptidase N is a Receptor for Tumor-homing Peptides and a Target for Inhibiting Angiogenesis", Cancer Research, 2000, 60, pp. 722-727.
Berdel, et al., "Animal safety, toxicology, and pharmacokinetic studies according to the ICH S9 guideline for a novel fusion protein tTF-NGR targeting procoagulatory activity into tumor vasculature. Are results predictive for humans?", Cancers, 2020, 12, 3536.
Berdel, et al., "Targeting tissue factor to tumor vasculature to induce tumor infarction", Cancers, 2021, 13, 2841.
Brand, et al., "Tumor growth inhibition via occlusion of tumor vasculature induced by N-terminally PEGylated retargeted tissue factor tTF-NGR", Mol. Pharmaceutics, 2015, 12, pp. 3749-3758.
Brand, et al., "Low-energy ultrasound treatment improves regional tumor vessel infarction by retargeted tissue factor", J. Ultrasound Med., 2015, 34: pp. 1227-1236.
Brand, et al., "NG2 proteoglycan as a pericyte target for anticancer therapy by tumor vessel infarction with retargeted issue factor", Oncotarget, 2016, 7(6), pp. 6774-6789.
Brand, et al., "Radiation synergizes with antitumor activity of CD13-targeted tissue factor in a HT1080 xenograft model of human soft tissue sarcoma", PLoS One, 2020, 15(2), e0229271.

(Continued)

*Primary Examiner* — Ruth A Davis
(74) *Attorney, Agent, or Firm* — Hovey Williams LLP; Crissa A. Cook

(57) ABSTRACT

The present invention provides compositions comprising Trabectedin or a tTF-NGR protein for use in the treatment of cancer in an individual, wherein the treatment comprises the following steps: (a) administering to the individual an effective amount of a composition comprising Trabectedin, and (b) subsequently administering to the individual an effective amount of a composition comprising a tTF-NGR protein.

14 Claims, 6 Drawing Sheets

Specification includes a Sequence Listing.

(56) References Cited

OTHER PUBLICATIONS

Dreischalück, et al., "Vascular infarction by subcutaneous application of tissue-factor targeted to tumor vessels with NGR-peptides: activity and toxicity profile", Int. J. Oncol., 2010, 37, pp. 1389-1397.

Gerwing, et al., "The beginning of the end for conventional RECIST—novel therapies require novel imaging approaches", Nature Rev. Clin. Oncol., 2019, 16, pp. 442-458.

Gerwing, et al., "Multiparametric magnetic resonance imaging for immediate target hit assessment of CD13-targeted issue factor tTF-NGR in advanced malignant disease", Cancers, 2021, 13, 5880.

Höink, et al., "Gadofosveset-enhanced MRI as simple surrogate parameter for real-time evaluation of the initial tumour vessel infarction by retargeted tissue factor tTF-NGR", Oncol. Letters, 2019, 17, pp. 270-280.

Kessler, et al., "Generation of fusion proteins for selective occlusion of tumor vessels", Current Drug Discovery Tech., 2008, 5, pp. 1-8.

Persigehl, et al., "Antiangiogenic tumor treatment: Monitoring Early Noninvasive Monitoring with USPIO-enhanced MR Imaging in Mice", Radiology, 2007, 244, pp. 449-456.

Persigehl, et al., "Prediction of antiangiogenic treatment efficacy by iron oxide enhanced parametric magnetic resonance imaging", Invest. Radiol., 2007, 42, pp. 791-796.

Persigehl, et al., "Non-invasive monitoring of tumor-vessel infarction by retargeted truncated tissue factor tTF-NGR using multimodal imaging", Angiogenesis, 2014, 17, pp. 235-246.

Schmidt, et al., "Potential therapeutic impact of CD13 expression in non-small cell lung cancer", PLoS One, 2017, 12(6): e0177146.

Schmidt, et al., "CD13 as target for tissue factor induced tumor vascular infarction in small cell lung cancer", Lung Cancer, 2017, 113, pp. 121-127.

Schwöppe, et al., "Tissue-factor fusion proteins induce occlusion of tumor vessels", Thrombosis Res., 2010, 125 (Suppl. 2), S143-S150.

Schwöppe, et al., "Using native gel electrophoresis or isoelectric focusing as experimental "clock" for the (iso) aspartate formation of tTF-NGR fusion proteins", Biomacromolecular Mass Spectrometry, 2012, 2, pp. 285-293.

Schwöppe, et al., "Anticancer therapy by tumor vessel infarction with polyethylene glycol conjugated tissue factor", J. Med. Chem., 2013, 56, pp. 2337-2347.

Teicher, et al., "Flipping the wound that doesn't heal: the upside of coagulation in cancer", Blood, 2009, 113, pp. 4827-4828.

Von Maltzahn, et al., "Nanoparticles that communicate in vivo to amplify tumour targeting", Nature Mater., 2011, 10, pp. 545-552.

Wang, et al., "Swarming towards the target", Nature Materials, 2011, 10(7), pp. 482-483.

Search Report in corresponding Chinese Patent Application Serial No. 2021800507809, dated Aug. 29, 2024 (English translation attached).

Sun, "Clinical Application Progress on New Drugs in Advanced Soft-tissue Sarcoma", Journal of Chinese Oncology, 2017, 23(11), pp. 956-966, 8 pages (English machine translation attached).

Office Action in corresponding Japanese Patent Application Serial No. 2023-512346, dated Jul. 22, 2025 (English translation attached).

Harati, et al., "TRAIL and taurolidine enhance the anticancer activity of doxorubicin, trabectedin and mafosfamide in HT1080 human fibrosarcoma cells," Anticancer Res., Jul. 2012;32(7):2967-84.

* cited by examiner

N - | His-tag | tTF 1-218 | GNGRAHA | - C
Figure 1
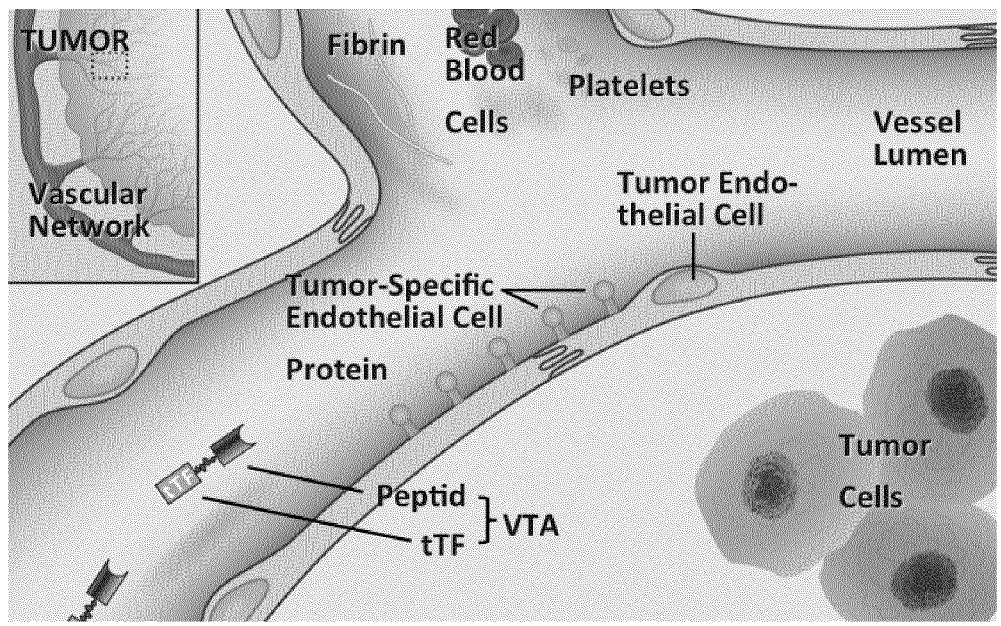
Figure 2A
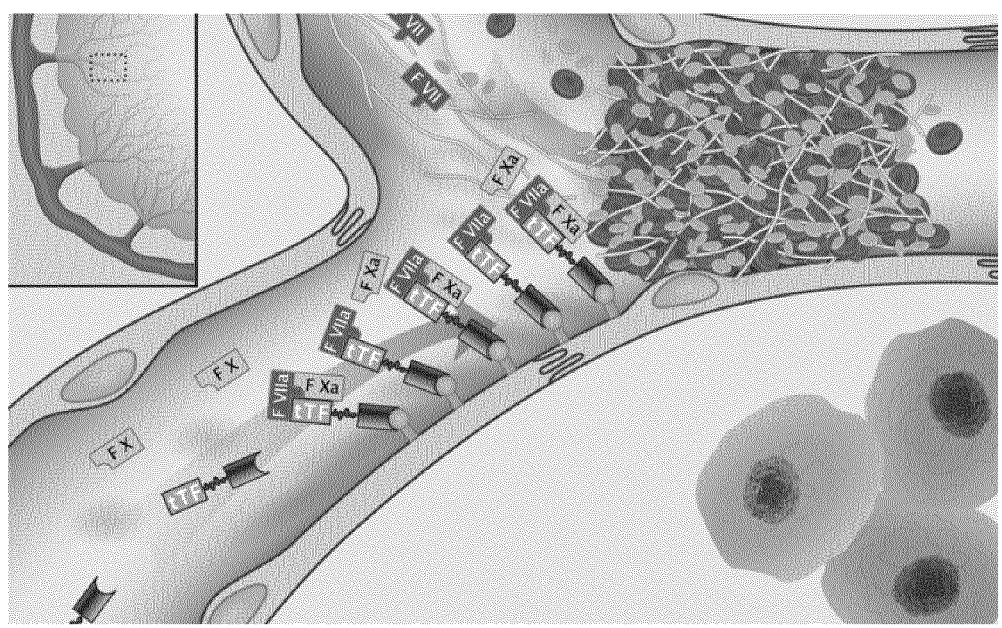
Figure 2B

SEQUENCE LISTING

```
<160> NUMBER OF SEQ ID NOS: 2

<210> SEQ ID NO 1
<211> LENGTH: 225
<212> TYPE: PRT
<213> ORGANISM: Artificial Sequence
<220> FEATURE:
<223> OTHER INFORMATION: tTF-NGR fusion protein

<400> SEQUENCE: 1

Ser Gly Thr Thr Asn Thr Val Ala Ala Tyr Asn Leu Thr Trp Lys Ser
1               5                   10                  15

Thr Asn Phe Lys Thr Ile Leu Glu Trp Glu Pro Lys Pro Val Asn Gln
            20                  25                  30

Val Tyr Thr Val Gln Ile Ser Thr Lys Ser Gly Asp Trp Lys Ser Lys
        35                  40                  45

Cys Phe Tyr Thr Thr Asp Thr Glu Cys Asp Leu Thr Asp Glu Ile Val
    50                  55                  60
```

```
Lys Asp Val Lys Gln Thr Tyr Leu Ala Arg Val Phe Ser Tyr Pro Ala
 65                  70                  75                  80

Gly Asn Val Glu Ser Thr Gly Ser Ala Gly Glu Pro Leu Tyr Glu Asn
                 85                  90                  95

Ser Pro Glu Phe Thr Pro Tyr Leu Glu Thr Asn Leu Gly Gln Pro Thr
            100                 105                 110

Ile Gln Ser Phe Glu Gln Val Gly Thr Lys Val Asn Val Thr Val Glu
        115                 120                 125

Asp Glu Arg Thr Leu Val Arg Arg Asn Asn Thr Phe Leu Ser Leu Arg
130                 135                 140

Asp Val Phe Gly Lys Asp Leu Ile Tyr Thr Leu Tyr Tyr Trp Lys Ser
145                 150                 155                 160

Ser Ser Ser Gly Lys Lys Thr Ala Lys Thr Asn Thr Asn Glu Phe Leu
                165                 170                 175

Ile Asp Val Asp Lys Gly Glu Asn Tyr Cys Phe Ser Val Gln Ala Val
            180                 185                 190

Ile Pro Ser Arg Thr Val Asn Arg Lys Ser Thr Asp Ser Pro Val Glu
        195                 200                 205

Cys Met Gly Gln Glu Lys Gly Glu Phe Arg Gly Asn Gly Arg Ala His
210                 215                 220

Ala
225

<210> SEQ ID NO 2
<211> LENGTH: 271
<212> TYPE: PRT
<213> ORGANISM: Artificial Sequence
<220> FEATURE:
<223> OTHER INFORMATION: His-tTF-NGR fusion protein

<400> SEQUENCE: 2

Met His His His His His Ser Ser Gly Leu Val Pro Arg Gly Ser
1               5                   10                  15

Gly Met Lys Glu Thr Ala Ala Ala Lys Phe Glu Arg Gln His Met Asp
                20                  25                  30

Ser Pro Asp Leu Gly Thr Asp Asp Asp Lys Ala Met Gly Ser Gly
            35                  40                  45

Thr Thr Asn Thr Val Ala Ala Tyr Asn Leu Thr Trp Lys Ser Thr Asn
 50                  55                  60

Phe Lys Thr Ile Leu Glu Trp Glu Pro Lys Pro Val Asn Gln Val Tyr
 65                  70                  75                  80

Thr Val Gln Ile Ser Thr Lys Ser Gly Asp Trp Lys Ser Lys Cys Phe
                 85                  90                  95

Tyr Thr Thr Asp Thr Glu Cys Asp Leu Thr Asp Glu Ile Val Lys Asp
            100                 105                 110

Val Lys Gln Thr Tyr Leu Ala Arg Val Phe Ser Tyr Pro Ala Gly Asn
        115                 120                 125

Val Glu Ser Thr Gly Ser Ala Gly Glu Pro Leu Tyr Glu Asn Ser Pro
130                 135                 140

Glu Phe Thr Pro Tyr Leu Glu Thr Asn Leu Gly Gln Pro Thr Ile Gln
145                 150                 155                 160

Ser Phe Glu Gln Val Gly Thr Lys Val Asn Val Thr Val Glu Asp Glu
                165                 170                 175

Arg Thr Leu Val Arg Arg Asn Asn Thr Phe Leu Ser Leu Arg Asp Val
            180                 185                 190
```

```
Phe Gly Lys Asp Leu Ile Tyr Thr Leu Tyr Tyr Trp Lys Ser Ser Ser
        195                 200                 205

Ser Gly Lys Lys Thr Ala Lys Thr Asn Thr Asn Glu Phe Leu Ile Asp
        210                 215                 220

Val Asp Lys Gly Glu Asn Tyr Cys Phe Ser Val Gln Ala Val Ile Pro
225                 230                 235                 240

Ser Arg Thr Val Asn Arg Lys Ser Thr Asp Ser Pro Val Glu Cys Met
                245                 250                 255

Gly Gln Glu Lys Gly Glu Phe Arg Gly Asn Gly Arg Ala His Ala
            260                 265                 270
```

COMPOSITION COMPRISING tTF-NGR FOR USE IN TREATING SOFT-TISSUE SARCOMA

RELATED APPLICATIONS

This application is the U.S. National Stage of International Patent Application No. PCT/EP2021/073234, filed Aug. 23, 2021, which is hereby incorporated by reference in its entirety, and which claims priority to European Patent Application No. 20192984.1, filed Aug. 26, 2020.

SEQUENCE LISTING

The sequences listed in the accompanying Sequence Listing are presented in accordance with 37 C.F.R. 1.822. The Sequence Listing is submitted as an ASCII computer readable text file, with a file name of "SequenceListing.txt," created on Jan. 19, 2023, as 4,531 bytes, which is incorporated by reference herein.

FIELD OF THE INVENTION

The present invention relates to the use of tTF-NGR and Trabectedin in the treatment of cancer, in particular soft-tissue sarcoma. The present inventors surprisingly found that the combination of tTF-NGR and Trabectedin provides an improved, preferably synergistic, therapeutic activity. Without being bound to theory, the improvement can be caused by several effects. The vascular tumor occlusion by tTF-NGR prolongs intratumoral accumulation of Trabectedin which results in higher antitumor efficacy. Further, a higher intratumoral pro-coagulatory activity of tTF-NGR can be caused by induction of early apoptosis in tumor cells and tumor endothelial cells by Trabectedin with resulting higher phosphatidylserine (PS) levels on these cells.

BACKGROUND OF THE INVENTION

Soft Tissue Sarcoma (STS) is a rare group of heterogeneous mesenchymal cancers originating from connective tissue. STS is made up of more than 100 distinct subtypes, which collectively account for 1% of all adult cancers and the incidence of STS in Europa sarcoma ranges between 2-5/100,000/year. They occur anywhere in the organism, common sites are extremities, trunk, retroperitoneum and head/neck. Exact histopathological diagnosis and grading as well as tumor staging by imaging is important, since it influences multidisciplinary therapy, best carried out in experienced reference centers. Due to the heterogeneity and the rarity of the disease, diagnosis is often late.

Surgery is the first line of treatment for early stage and localized STS. However, distant metastases occur in many patients, especially in those with high-grade tumors. For patients with unresectable STS, chemotherapy is the standard of treatment and the therapeutic approach is multidisciplinary. In cases with metastatic disease, the therapeutic aim often is restricted to palliation and/or prolongation of progression-free survival time instead of cure. First line systemic therapy is based on doxorubicin alone or in several combinations such as doxorubicin and ifosfamide. The combination of gemcitabine and docetaxel seems to be equally effective as doxorubicin, but induces more severe hematotoxicity and is sometimes reserved for second line therapy. Besides conventional chemotherapy, Trabectedin, pazopanib, and eribulin are alternatives for second- and further line therapy, eribulin only in liposarcoma. However, overall survival of patients with advanced STS in general remains poor. Thus, there is an unmet medical need for new therapeutic targets and agents in this group of diseases.

Growth and spread of tumors is dependent from intratumoral neovascularization to deliver nutrients and oxygen and remove metabolic waste products. Tumor endothelial cells (TEC) are essential for building tumor vessels and among other cell types such as fibroblasts and some myeloid and immune cells belong to the tumor-supportive stroma. TEC express novel targets absent from resting endothelial cells in the mature vasculature of the organism. Some of these TEC targets are clinically relevant for anti-angiogenic therapy against cancer, which led to numerous drugs approved for cancer treatment (e.g. bevacizumab (anti-VEGF moAB), aflibercept (VEGF trap), ramucirumab (anti-VEGF-R moAB), Sunitinib, Sorafenib, Pazopanib (examples for tyrosine kinase inhibitors for TEC tyrosine kinase receptors)). Therapeutic activity of these drugs is limited to few months increase of survival and occurrence of resistance limits the approach.

Conceptually different from anti-angiogenic treatment is the anti-vascular approach. Antivascular drugs do not only interfere with vessel formation, but aim to destroy neo-vessels already present in the tumors. Denekamp et al. proposed existing tumor vessels and tumor endothelial cells as target carriers for anti-vascular therapy (Denekamp et al., Br.J. Cancer, 1982). The tumor vasculature indeed presents therapeutic targets for antiangiogenic therapies, vascular disruption, or vascular occlusion and thrombosis with subsequent tumor infarction. Huang et al. introduced the concept of tumor vessel occlusion by targeted Tissue Factor (TF) (Huang et al., Science, 1997). Pasqualini et al. characterized small NGR (asparagine-glycine-arginine)-containing peptides, binding to aminopeptidase N (APN, also known as CD13) as a tumor vascular target (Pasqualini et al., Cancer Res., 2000). CD13 has been shown to promote angiogenesis, tumor growth, and metastasis (Guzman-Rojas et al., Proc. Natl. Acad. Sci., 2012) and has also been shown to be of prognostic relevance for patients with cancer of some but not all histologies examined (Tokuhara et al., Clin. Cancer Res., 2006).

Trabectedin is a tetrahydroisoquinoline alkaloid available as Yondelis® from Pharma Mar, Madrid, Spain. Trabectedin was first extracted from the Caribbean sea squirt Ecteinascidia turbinata but is now synthetically produced and is registered in Europe and other countries for the treatment of adult patients with advanced soft tissue sarcoma (Germano et al., Cancer Cell. 2013; 23(2):249-262). Trabectedin acts as a DNA-binding agent and binding to the DNA double helix leads to interference with several transcription factors, DNA-binding proteins, and DNA-repair pathways, resulting in G2/M cell cycle arrest and ultimately apoptosis. Trabectedin was further found to provide a therapeutic option for metastatic lipo- and leiomyosarcoma as well as a promising candidate for the treatment of synovial sarcomas and high-grade undifferentiated pleomorphic sarcoma (De Santis et al., Drug Design, Develop. and Therapy 9: 5785-5791, 2015).

However, thrombogenic vascular targeting agents could theoretically cause severe systemic side effects, such as pulmonary embolism or stroke. Hence, developing safe and effective dosage regimens for the therapeutic uses of the vascular targeting agents is of utmost preclinical and clinical importance.

SUMMARY OF THE INVENTION

The present invention surprisingly found that the combination of tTF-NGR and Trabectedin provides an improved, preferably synergistic, therapeutic activity.

The present invention provides a composition comprising Trabectedin for use in the treatment of cancer in an individual, wherein the treatment comprises the following steps:
(a) administering to the individual an effective amount of a composition comprising Trabectedin, and
(b) subsequently administering to the individual an effective amount of a composition comprising a tTF-NGR protein.

The present invention also provides a composition comprising a tTF-NGR protein for use in the treatment of cancer in an individual, wherein the treatment comprises the following steps:
(a) administering to the individual an effective amount of a composition comprising Trabectedin, and
(b) subsequently administering to the individual an effective amount of a composition comprising the tTF-NGR protein.

In one embodiment, the cancer of the individual is inoperable, metastatic or refractory.

In a further embodiment, the cancer is soft-tissue sarcoma and is preferably selected from a group consisting of: dedifferentiated liposarcoma, myxoid liposarcoma, pleomorphic liposarcoma, adult fibrosarcoma, myxofibrosarcoma, leiomyosarcoma, rhabdomyosarcoma, angiosarcoma, synovial sarcoma, and undifferentiated sarcoma.

In another embodiment, the composition comprising Trabectedin and the composition comprising tTF-NGR are administered to the individual via intravenous infusion.

In yet another embodiment, the composition comprising Trabectedin is administered to the individual via a 24-hour intravenous infusion. Preferably, Trabectedin is administered at a dose of 1.5 mg/m².

In a preferred embodiment, the tTF-NGR protein comprises or has the sequence of SEQ ID NO: 2. In an alternative embodiment, the tTF-NGR protein has the sequence of SEQ ID NO: 1. SEQ ID NO: 2 comprises SEQ ID NO: 1 and the N-terminal His-tag, which comprises the N-terminal 46 amino acid residues. While the N-terminal His-tag was maintained in the protein used in the Examples below, it is understood that this is not necessary for the activity of the protein. SEQ ID NOs: 1 and 2 further comprise the sequence of the tTF, amino acids 47 to 264 of SEQ ID NO: 2, and the NGR sequence, amino acids 265 to 271 of SEQ ID NO: 2.

In another embodiment, the first administration of the tTF-NGR protein is started between 1 minute and 1 hour after the end of the administration of Trabectedin. Preferably, tTF-NGR protein is administered to the individual via a 1-hour intravenous infusion. More preferably, the administration of the tTF-NGR protein is repeated once per day for the next 4 consecutive days after the administration of Trabectedin.

In a further embodiment, the tTF-NGR protein is administered at a dose of 3 mg/m²/day. Preferably, the tTF-NGR protein is administered in a 0.9% NaCl solution in a total infusion volume of 100 ml. More preferably, the tTF-NGR protein is infused via a central venous port access.

DESCRIPTION OF THE FIGURES

FIG. 1: illustration of the schematic structure of the lead compound tTF-NGR with a N-terminal His-tag for detection and purification, full-length tTF, and the targeting peptide with the NGR-motif at the C-terminus.

FIG. 2: illustration of the targeting and accumulation of TF-activity to tumor vasculature, and the induction of tumor vascular thrombosis and infarction leading to tumor cell death. A, Components of the tumor vascular infarction at the onset of therapy and B, during tumor vascular clotting. FXa, factor X activated (light blue), FVIIa, factor VII activated (blue).

DETAILED DESCRIPTION OF THE INVENTION

Anti-vascular compounds in the form of bi-functional molecules targeting a specific structure on TECs with one moiety and having an antitumor payload as a second moiety were known in the prior art. This class of vascular targeting compounds aims to target more than a single tumor type via the common tumor vasculature. Drugs targeting tumor cells containing only one histological entity have been approved for treatment of specific tumors, such as moABs to tumor cell associated molecules carrying toxins (brentuximab vedotin (CD30+Hodgkins disease), trastuzumab emtansine (HER2+ breast cancer)).

A further class of fusion proteins had been developed, which was named tTF-NGR, wherein the non-specific membrane anchor of tissue factor (TF) is replaced by the NGR motif binding CD13. CD13 is an aminopeptidase selectively occurring on stimulated and growing EC, as on TEC, with low expression on other tissues (http://www.proteinatlas.org/ENSG00000166825-ANPEP/tissue). In some normal tissues such as small bile ducts, expression of CD13 furthermore is present, but does not disturb application of CD13-targeted TF, since this molecule is active only in a coagulation-competent location, such as in blood vessels, and not elsewhere. With this fusion protein (FIG. 1), TF-activity is targeted and accumulated to tumor vasculature and tumor vascular thrombosis and infarction are induced leading to tumor cell death (FIG. 2).

Figure 3:
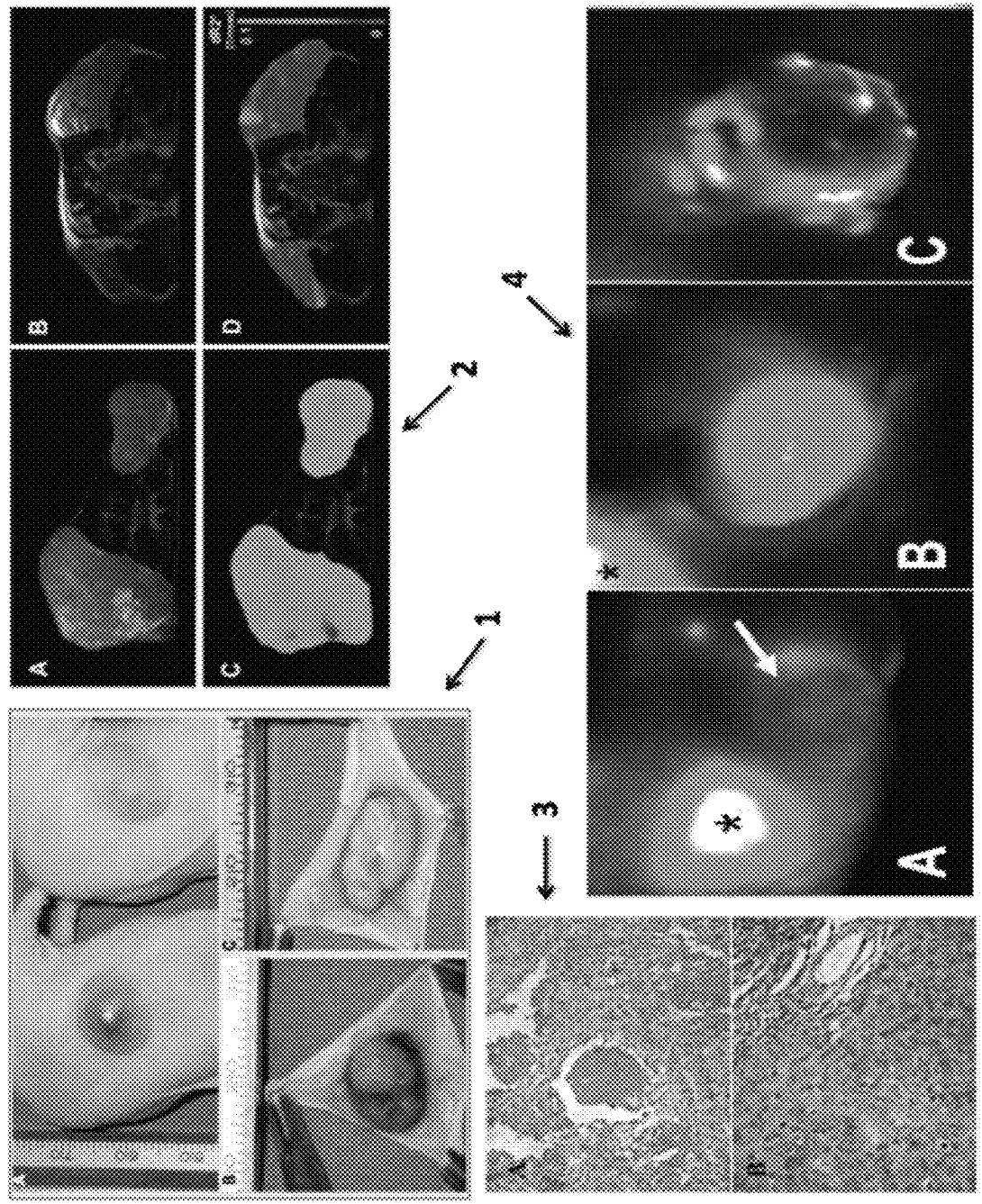
FIG. 3: illustration of the therapeutic activity and modes of action of tTF-NGR by different imaging techniques. 1. Bluish coloration of the tumor (A, left: tTF-NGR. A, right: vehicle control) few hours after injection of tTF-NGR macroscopically visualizing blood pooling and vascular disruption. 2. Intravascular contrast enhanced Magnetic Resonance Imaging (MRI) of the tumor showing anatomy of the tumors (A, B) and drastic decrease of blood flow from high blood flow (C) to low (D) few hours after tTF-NGR application. The vascular volume fraction was quantified to decrease>1 log. 3. H&E staining of sarcoma xenograft tissue (A, thrombosis, blood pooling and vascular disruption after tTF-NGR; B, saline control with normal vasculature). 4. In vivo fluorescence reflectance imaging showing the vascular anatomy by intravascular fluorescent fibrin after tTF-NGR (B). A, before tTF-NGR; B, 1 hour after tTF-NGR; C, vascular disruption 24 hours after tTF-NGR.

These fusion proteins were tested in vitro and in vivo for essential therapeutic properties, such as pro-coagulatory activity, specific binding to their respective target molecules on stimulated endothelial cells (EC) or pericytes, in vivo intratumoral accumulation, in vivo intratumoral activation of coagulation, tumor vascular occlusion and inhibition of blood flow, pharmacodynamic properties including therapeutic antitumor activity in xenotransplants of human tumors from different histologic origin, and finally rodent as well as non-rodent animal safety and toxicology. As demonstrated in the experimental results, while retaining complete pro-coagulatory activity, tTF-NGR specifically binds to CD13 on growing EC, it leads to tumor vessel occlusion and infarction with resulting tumor growth inhibition and regression (FIG. 3). Preclinical therapeutic activity of tTF-NGR was independent of tumor histology (e.g. melanoma, lung, breast, sarcoma, glioblastoma). Repeated rounds of treatment showed no resistance development.

Apart from the particular advantages of tTF-NGR, the present invention surprisingly found that the combination of tTF-NGR and Trabectedin can show synergistic therapeutic activity. Trabectedin is an anti-neoplastic drug originally isolated from *Ecteinascidia turbinata*, a sea squirt. The drug exerts its anti-neoplastic activity by binding the minor groove of DNA during replication, causing double strand breaks in the double helix. Moreover, Trabectedin has been found to have a pleiotropic mechanism of action in regulating the inflammatory mediators in the tumor micro-environment. This effect is possibly achieved by selective inhibition of the production of pro-inflammatory cytokines and chemokines such as interleukin-6 (IL-6), chemokine ligand 2 (CCL2), matrix-binder protein pentraxin 3 (PTX3), and vascular endothelial growth factor (VEGF). In addition, Trabectedin depletes macrophages in tumor tissue and macrophage targeting appears to be a key component of its anti-neoplastic activity. Trabectedin as a single agent is commonly used as a standard $2^{nd}$ line treatment of metastatic or refractory STS. In a combination of tTF-NGR with Trabectedin as demonstrated in present invention, both drugs showed increased anti-sarcoma activity in comparison to standard Trabectedin monotherapy or tTF-NGR monotherapy in a xenograft model. Given this this multifold mode of action of Trabectedin on the tumor cells and the different cells and molecular components of the tumor stroma a combinatorial therapeutic efficacy by Trabectedin with tTF-NGR was unforeseeable. tTF-NGR has shown preclinical activity in human STS xenografts by tumor vascular occlusion and infarction and can improve the antitumor activity of Trabectedin in these models in vivo by entrapping Trabectedin inside the tumor, which leads to a stronger antitumor activity with a longer duration. Vice versa, Trabectedin increases the pro-coagulatory efficacy of tTF-NGR in the tumor vasculature. The binding side of tTF-NGR, CD13, is strongly expressed in the vascular system and/or on the tumor cells of human STS. This provides a biomarker for patient selection for this combination which can be further studied for predictiveness of the activity of the combination treatment.

The present invention further provides clinical dose-regimens for using tTF-NGR and Trabectedin in a combination therapy to treat patients with cancer, in particular soft-tissue sarcoma.

The present invention provides a composition comprising Trabectedin for use in the treatment of cancer in an individual, wherein the treatment comprises the following steps:
    (a) administering to the individual an effective amount of a composition comprising Trabectedin, and
    (b) subsequently administering to the individual an effective amount of a composition comprising a tTF-NGR protein (preferably comprising or having SEQ ID NO: 2).

The present invention also provides a composition comprising a tTF-NGR protein for use in the treatment of cancer in an individual, wherein the treatment comprises the following steps:
    (a) administering to the individual an effective amount of a composition comprising Trabectedin, and
    (b) subsequently administering to the individual an effective amount of a composition comprising the tTF-NGR protein (preferably comprising or having SEQ ID NO: 2).

In another embodiment, the composition comprising Trabectedin and the composition comprising tTF-NGR (preferably comprising or having SEQ ID NO: 2) are administered to the individual via intravenous infusion.

In one embodiment, the composition comprising Trabectedin is administered to the individual via a 24-hour intravenous infusion. Preferably, Trabectedin is administered at a dose of 1.5 mg/m$^2$.

In one embodiment, the tTF-NGR protein has the sequence of SEQ ID NO: 2.

The first dose of tTF-NGR protein can be administered between 1 minute and 1 hour after the end of the administration of Trabectedin. Preferably, tTF-NGR protein is administered to the individual via a 1-hour intravenous infusion. More preferably, the administration of the tTF-NGR protein is repeated once per day for the next 4 consecutive days after the administration of Trabectedin, e.g.: Trabectedin on Monday 8 am to Tuesday 8 am followed by tTF-NGR on Tuesday not later than 9 am and on the following days (last tTF-NGR on Friday).

In a further embodiment, the tTF-NGR protein is administered at a dose of 3 mg/m$^2$/day. Preferably, the tTF-NGR protein is administered in a 0.9% NaCl solution in a total infusion volume of 100 ml. More preferably, the tTF-NGR protein is infused via a central venous port access.

In a preferred embodiment the present invention thus provides a composition comprising Trabectedin or a tTF-NGR protein for use in the treatment of cancer in an individual, wherein the treatment comprises the following steps:

(a) administering to the individual an effective amount of a composition comprising Trabectedin, and
(b) subsequently administering to the individual an effective amount of a composition comprising the tTF-NGR protein having SEQ ID NO: 2; and
wherein Trabectedin is administered to the individual via a 24-hour intravenous infusion; and
wherein the first administration of the tTF-NGR protein is started between 1 minute and 1 hour after the end of the administration of Trabectedin; and
wherein the tTF-NGR protein is administered to the individual via a 1-hour intravenous infusion; and
wherein the administration of the tTF-NGR protein is repeated once per day for the next 4 consecutive days after the administration of Trabectedin.

Preferably, the cycle length of the treatment is 3 weeks. Patients are treated in repeated cycles until definite disease progression (iRECIST; Seymour L, *Lancet Oncol.* 2017) in the absence of other withdrawal criteria, and as long as neither patient nor investigator requests treatment discontinuation.

In one embodiment, the cancer of the individual is inoperable, metastatic or refractory. In a further embodiment, the cancer is soft-tissue sarcoma and is preferably selected from a group consisting of: dedifferentiated liposarcoma, myxoid liposarcoma, pleomorphic liposarcoma, adult fibrosarcoma, myxofibrosarcoma, leiomyosarcoma, rhabdomyosarcoma, angiosarcoma, synovial sarcoma, and undifferentiated sarcoma.

Unless indicated otherwise, for the purpose of the present application, the following terms are intended to have the meanings denoted below as used in the Description and Claims.

"Patients" refer to mammal, preferably human. In some embodiments, the patients are those having failed standard 1st line treatment or ineligible for standard treatment.

"Therapeutically effective amount" means an amount of a compound that, when administered to a subject for treating a disease state, is sufficient to effect such an improvement of the disease state.

"Trabectedin" refers to a tetrahydroisoquinoline alkaloid CAS registry number (Chemical Abstracts Service) 0114899-77-3 described in the literature (for example in Germano et al., Cancer Cell. 2013; 23(2):249-262) and available as Yondelis® from Pharma Mar, Madrid, Spain.

"Treatment/treating" means any administration of therapeutically effective amount of a compound, and includes:
inhibiting the disease in humans that is experiencing or displaying the pathology or symptomatology of the disease (i.e., retarding further development of the pathology and/or symptomatology), or
ameliorating the disease in humans that is experiencing or displaying the pathology or symptomatology of the disease (i.e., reversing the pathology and/or symptomatology).

"iRECIST" refers to a series of modifications to the Response Evaluation Criteria in Solid Tumours (RECIST version 1.1) that account for the apparent tumor growth that sometimes occurs before tumor load begins decreasing—a phenomenon known as pseudoprogression. These responses occur in a small but consequential fraction of patients receiving checkpoint inhibitors and other immune-modulating agents. The iRECIST guidelines (Seymour L, *Lancet Oncol.* 2017) have been developed by a team led by Lesley Seymour, MD, PhD, an oncologist at the Canadian Cancer Trials Group based at Queen's University in Kingston, Ontario.

"PFS" refers to progression free survival, according to iRECIST at week 15 (i.e., after 5 cycles), then at weeks 24, 33, 42, and 51 (i.e., every 9 weeks or after 3 cycles adjusted to cycle length of 3 weeks), and every 3 months thereafter. The reason for using the iRECIST modification of RECIST for evaluation rests in the observation within preclinical studies and clinical cases, that upon tTF-NGR application intratumoral swelling by blood pooling and vascular disruption can occur and lead to pseudoprogressions.

"OS" refers to overall survival rate at 12 and 18 months.

"CR" refers to complete response, which means disappearance of all target lesions. Any pathological lymph nodes (whether target or non-target) must have reduction in short axis to <10 mm.

"PR" refers to partial response, which means at least a 30% decrease in the sum of diameters of target lesions, using the baseline sum diameters as reference.

"PD" refers to progressive disease, which means at least a 20% increase in the sum of diameters of target lesions, using the smallest sum in the study as reference (this includes the baseline sum if that is the smallest in the study). In addition to the relative increase of 20%, the sum must also demonstrate an absolute increase of at least 5 mm. (Note: the appearance of one or more new lesions is also considered progression, the rules as described in chapter 6.1.1 must be observed before a progression can be used for ending the treatment in a patient.

"SD" refers to stable disease, which means neither sufficient shrinkage to qualify for PR nor sufficient increase is observed to qualify for PD, using the smallest sum diameters as reference in the study.

"TF" refers to the tissue factor, the known tissue factor protein described in the prior art, for example in Huang et al., *Science*, 1997.

"tTF" refers to a known truncated active form of amino acids 33 to 251 the tissue factor protein also described in Huang et al., *Science*, 1997. The tTF sequence is encompassed by the fusion protein sequence of SEQ ID NOs: 1 and 2 (amino acids 47 to 264 of SEQ ID NO: 2).

Example 1. Improved Therapeutic Activity of tTF-NGR and Trabectedin

Figure 4A:
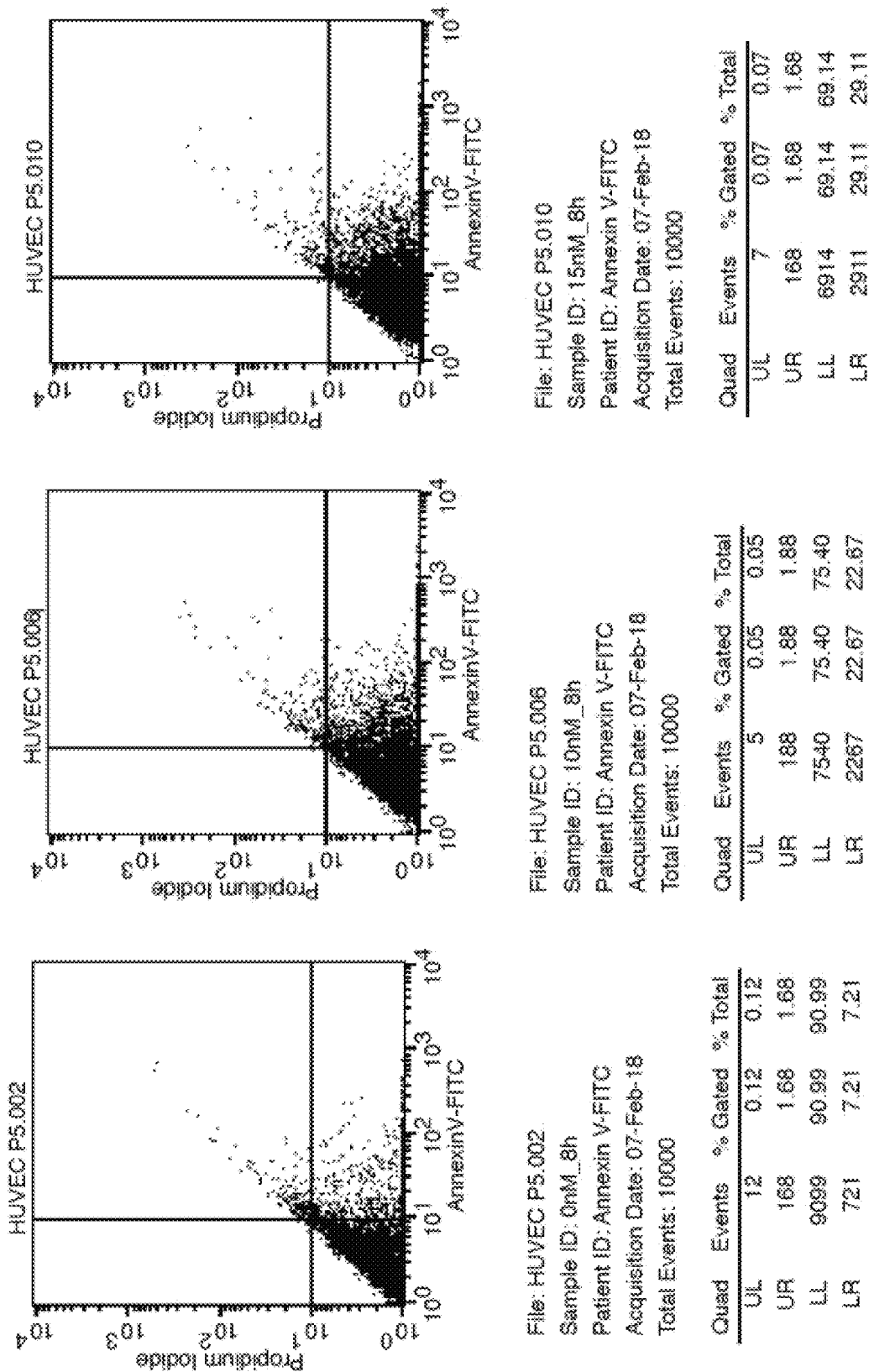
FIG. 4: illustration of the synergistic activity of tTF-NGR and Trabectedin in human vascular endothelial cells (HUVEC). A, One example of a flow cytometry experiment showing PS upregulation by Trabectedin on HUVEC cell membranes. PS is detected by the fluorescent PS-binding annexin V-FITC. PS-positive cells are shown in the lower right quadrant (LR) and increase from 7.21% without to 29.22% with Trabectedin (15 nM, 8 h incubation). B, Evaluation of 7 different experiments with different doses of Trabectedin inducing PS upregulation on HUVECs after 8 and after 12 h by increasing doses of Trabectedin (P values for all time points<0.0001 when compared to the non-Trabectedin control (NTC). Propidiumiodide was used as an internal necrosis control. C, Trabectedin-dependent increase of pro-coagulatory activity of HUVECs upon binding of tTF-NGR (black, without Trabectedin, grey, with Trabectedin (10 nM, 8 h)) and complete abrogation of this effect by masking of PS with annexin V at different doses. Means of 3 experiments with at least 4-fold assays each+standard error and p-values.
Figure 4B:
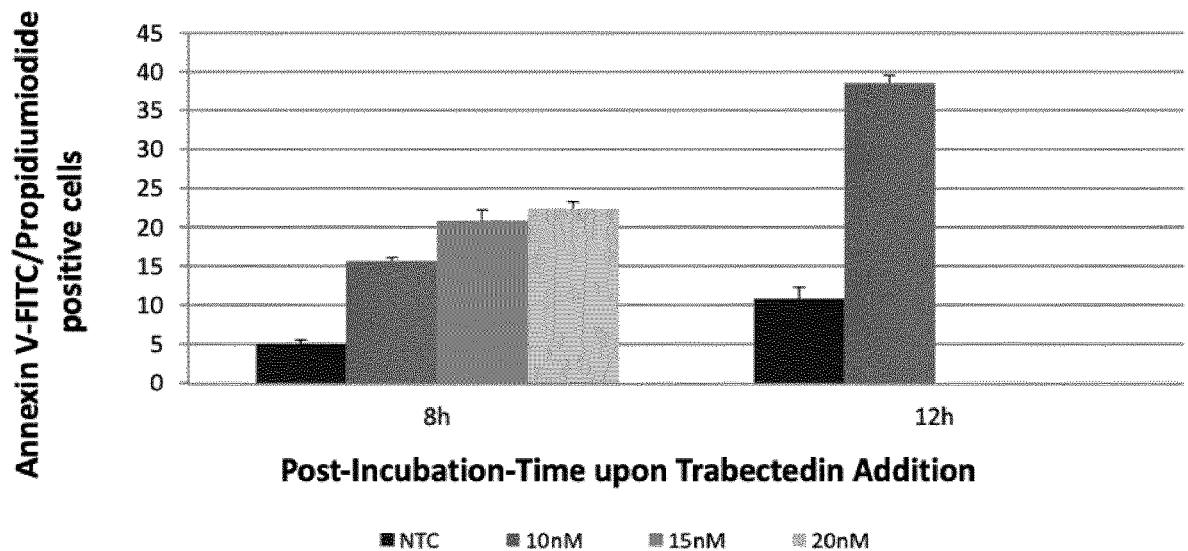
Figure 4C:
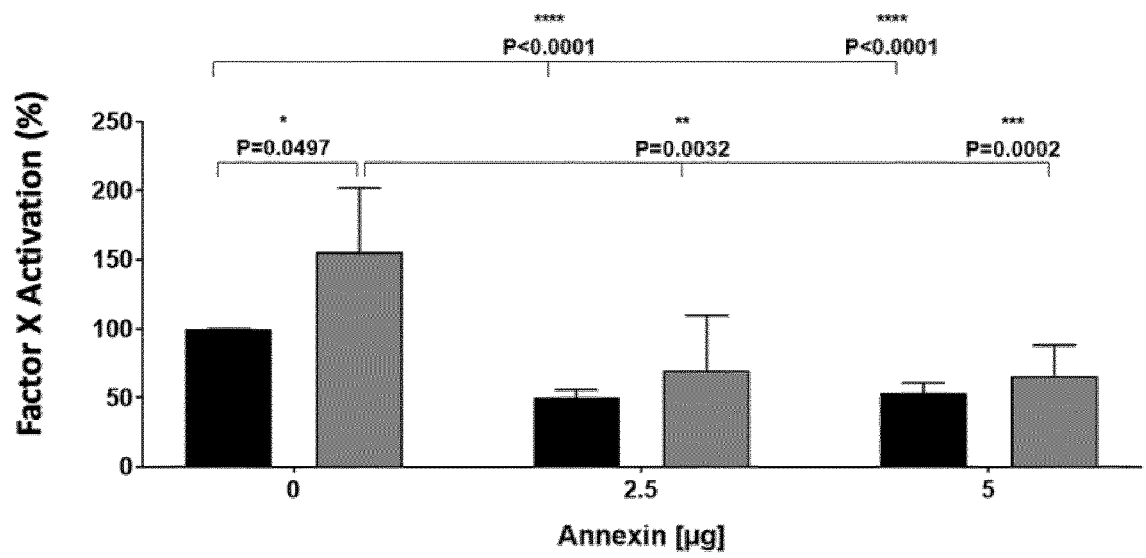

The scientific hypothesis of combining tTF-NGR and Trabectedin lies in that the pro-apoptotic activity of Trabectedin on human vascular endothelial cells (HUVEC) and also tumor cells significantly increases phosphatidylserine (PS) presence on the outer leaflet of the phospholipid bilayer building the cell membrane (see FIGS. 4A and B for HUVECs as an example) and by this optimized phospholipid milieu in the outer cellular membrane potentiates the pro-coagulatory efficacy of tTF-NGR within the tTF-NGR:Factor VIIa:Factor X complex on the cell membrane (FIG. 4 C). This effect is specifically dependent on the presence of PS as it can be completely abolished by masking PS via preincubation with annexin V.

Figure 5A:
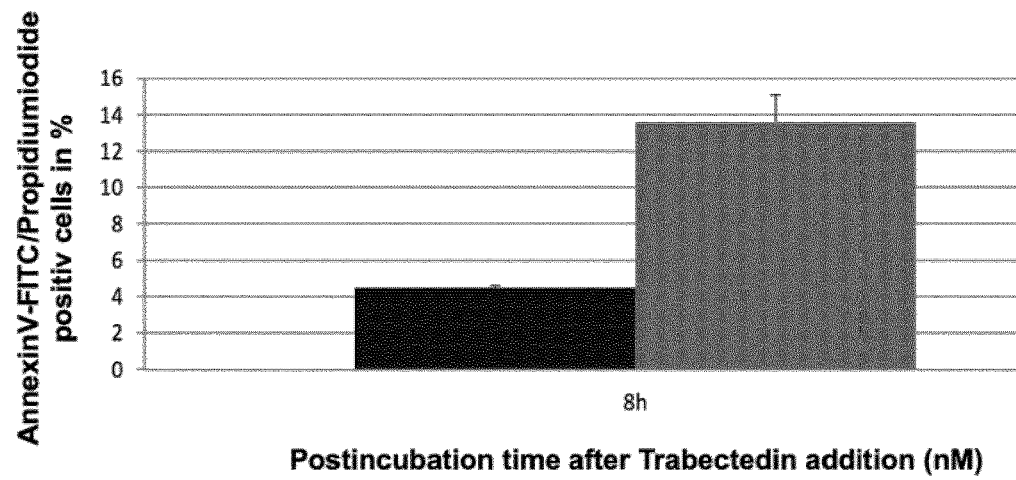
FIG. 5: illustration of the synergistic activity of tTF-NGR and Trabectedin in HT1080 human sarcoma cells. A, Evaluation of 6 different experiments with 10 nM of Trabectedin (grey) and 8 h incubation time showing significant PS upregulation on HT1080 sarcoma cells when compared to the non-Trabectedin control (black). Means+standard error (p value=0.001). Propidiumiodide was used as an internal necrosis control. B, Trabectedin-dependent increase of pro-coagulatory activity of HT1080 sarcoma upon binding of tTF-NGR (black, without Trabectedin, grey, with Trabectedin (10 nM, 8 h)) and complete abrogation of this effect by masking of PS with annexin V at different doses. Means of 4 experiments+standard error and p-values.
Figure 5B:
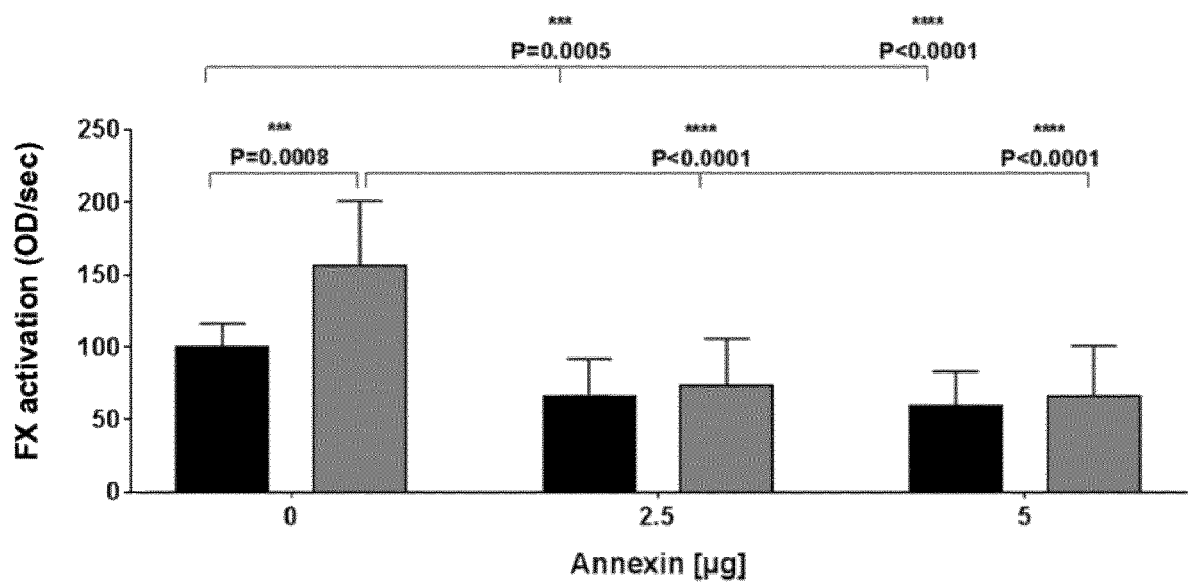

As in tumor tissues part of the inner vascular cell layer of the neovasculature is not formed by endothelial cells, but also by tumor cells, which is termed "vascular mimicry", analog experiments were also performed with HT1080 human sarcoma cells instead of HUVECs (see FIG. 5).

Figure 6:
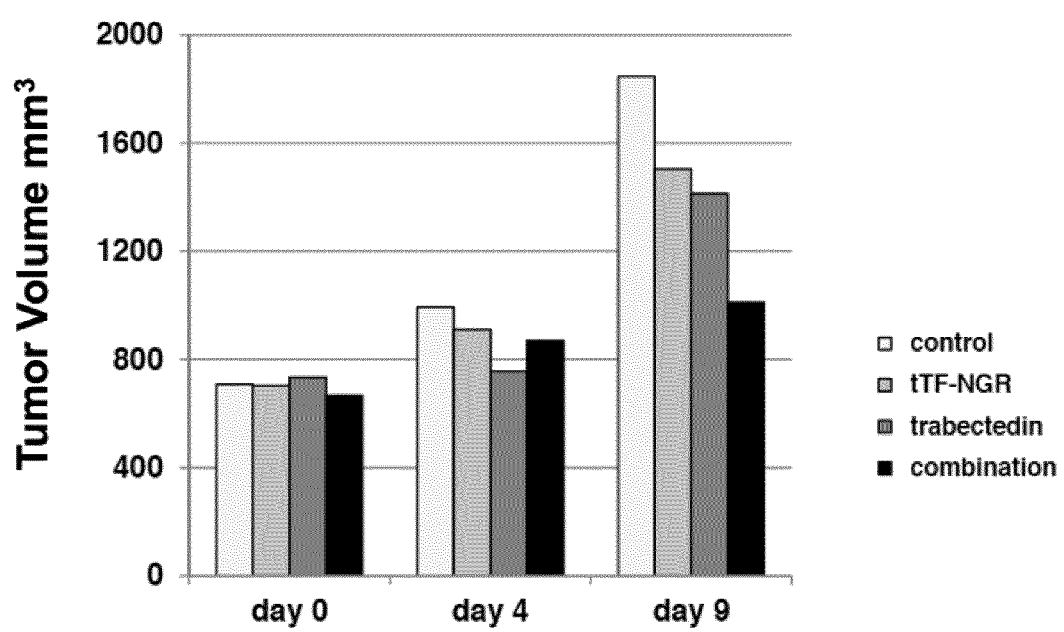
FIG. 6: therapeutic results of the combination of Trabectedin with tTF-NGR in vivo in a HT1080 STS xenograft model. Control, PBS iv; tTF-NGR 1 mg/kg, day 0; Trabectedin 0.1 mg/kg day 0; combination, Trabectedin plus tTF-NGR (5 h after Trabectedin) with identical doses and time schedule (control n=8, tTF-NGR n=9, Trabectedin n=9, combination n=11).

To exploit improved activity in both directions, a combination of Trabectedin with tTF-NGR was investigated using a pharmacokinetic approach, by application of tTF-NGR approx. 5 hours after injection of Trabectedin. The results show a considerable improvement of the therapeutic activity in comparison to the two individual drugs in a human STS xenograft model HT1080 (FIG. 6).

Example 2. Clinical Phase I Study of tTF-NGR tTF-NGR was produced using *E. coli* via a clinical-grade production process and a 4-step HPLC purification. The production process and the GMP facility are approved by the regional government (Manufacturer's Authorisation by Regierungspräsidium) and the federal Paul Ehrlich-Institute (PEI). Toxicity evaluation according to EU-guidelines S6 and S9 in mouse, rat, guinea pigs, and dogs has been completed. Limiting toxicity in the most sensitive species (mouse) was pulmonary embolism, in this species tTF-NGR has a therapeutic safety window of 1:4 (therapeutic dose: LD10 dose=1:5).

Clinical phase I study overview with tTF-NGR is presented in Table 1.

catheter-related venous thrombosis was observed at 4 mg/m$^2$ (CTCAE grade II and resolved), and an transient ischemic attack (CTCAE II resolved) in a patient with an angiosarcoma in the left atrium of the heart was observed at 3 mg/m$^2$, events reasonably related to, but not necessarily caused only by tTF-NGR. Thus, the trial was completed with a recommended dose for phase II (RPIID) at 3 mg/m$^2$/day×5, q d 22. The investigational medicinal product (IMP) is given via a PORT central venous access in 100 mL 0.9% NaCl over a rate-controlled infusion with a 1-hour duration.

Pharmacokinetic studies of the study have indicated a mean terminal half life of tTF-NGR of 8.99 h. There was no accumulation with repeated cycles, as the levels before treatment were always reached before the next cycle started.

Specific inhibition of tumor blood flow (intratumoral blood circulation) was observed in the patients measurable with CEUS and MRI without blood flow decrease in normal organs. The tumor blood flow inhibition was up to >1-log-

TABLE 1

Clinical phase I study performed during the development of tTF-NGR.

| Study ID | Study Design/ Objectives | Population/ No. of subjects | Dose Regimens |
| --- | --- | --- | --- |
| EudraCT-No.: NCT02902237 | tTF-NGR Phase I Study tTF-NGR via central venous access as daily 1-hour infusions for 5 days, q day 22; intra-individual dose-escalations in follow-up cycles allowed. Patients within the dose-escalation part were treated in sequence and not in parallel. Primary Objective: To evaluate the maximum tolerated dose (MTD) and the Dose-Limiting Toxicity (DLT) of intravenously (iv) infused daily applications of tTF-NGR for 5 days every 3 weeks in patients with relapsed or refractory cancer, who had obtained all standard treatment known for their disease entity prior to entry on study. Secondary Objectives: 1. To determine the perfusion and vascular volume fraction of measurable tumor lesions vs. normal reference tissue before and after tTF-NGR application by MRI and/or CEUS as a biological surrogate parameter for biological activity of the IMP in the patients treated within the verification cohorts. 2. To obtain pharmacokinetic data. | 2016-003042-85 Late stage solid tumor and lymphoma patients beyond all standard treatment. No. of subjects: 24 24 of whom 17 were actually treated with tTF-NGR | Starting dose: 1 mg/m$^2$ per day DLT: Dose limiting toxicity (DLT) at 4 and 5 mg/m$^2$ per day Verification group: RPIID verification group with 3.0 mg/m$^2$ tTF-NGR per day (×5) |

A clinical phase I trial was performed (EudraCT-No.: 2016-003042-85; NCT02902237) with tTF-NGR applied as 1-hour infusion solved in 0.9% NaCl via a central venous line in late stage cancer patients. This trial was a first-in-class trial, which was guided by repeated contrast-enhanced ultrasound (CEUS) and MRI to assess for blood flow decrease in tumor signal lesions. A "5-day q day 22" schedule was used in the study design.

At 4 mg/m$^2$/day, a dose-limiting toxicity (DLT) was observed as temporary troponin T hs showed increase without any clinical sequelae. This sensitive laboratory DLT was fast reversible and allows early monitoring for subsequent dose adjustment in future trials. Further, one CTCAE grade II lower limb deep vein thrombosis (1 patient, completely resolved) was also observed at 5 mg/m$^2$, a central venous step. Further, in some metastases fast development of areas was observed with MRI, interpreted as intratumoral bleeding and necrotic areas, similar to the observations in the xenograft models. In none of the patients treated so far a CR or a PR could be observed. Two patients however had stable disease (SD) for several months after treatment. Human anti-fusion protein antibodies (HAFA) were detected in few patients without evidence of clinical symptoms (anaphylactic or anaphylactoid reactions) or neutralizing capacity when correlated with the tumor blood flow inhibition in MRI or CEUS.

In conclusion, tTF-NGR can be applied safely and observations in phase I represent proof-of-principle for tumor blood flow inhibition in the clinical situation and a promising therapeutic range. Further, there are multiple effective methods to antagonize theoretically occurring systemic toxicity (heparin, COX-inhibitors, dual platelet inhibition with aspirin and P2Y12 inhibitors, fibrinolysis).

Example 3. The Clinical Study Design for Testing the Anti-Sarcoma Activity of the Combination of tTF-NGR and Trabectedin 3.1 Study Design The study design consists of Phase open label, randomized, controlled study in subjects with or metastatic or refractory soft tissue sarcoma, over a total recruitment duration of 36 months.

The participants in the study are patients between 18-75 years of age, with advanced or metastatic soft-tissue sarcoma after failure of anthracycline-containing 1st line therapy or with contraindications to these drugs. Patients must have histological evidence of high-grade advanced unresectable or metastatic soft tissue sarcoma (grade 2-3) according to the FNCLCC grading system, including the following tumor types: dedifferentiated liposarcoma, myxoid liposarcoma (high grade), pleomorphic liposarcoma, adult fibrosarcoma, myxofibrosarcoma (high-grade), leiomyosarcoma, rhabdomyosarcoma (alveolar, pleomorphic), angiosarcoma, synovial sarcoma, undifferentiated sarcoma. CD13 positivity in central histology (grade 1+; Kessler T et al. Translational Oncology 2018) is a prerequisite for entry on study. The participants must have at least one unidimensionally measurable lesion by computed tomography as defined by iRECIST (Response Evaluation Criteria in Solid Tumors; Seymour L, Lancet Oncol. 2017) criteria 1.1. This lesion should not have been irradiated during previous treatments. It is also required that the participants have life expectancy of at least 3 months with ECOG≤2 and no contradictions for Trabectedin. 120 evaluable patients are enrolled and parallel assigned in a 1:1 fashion to one of two different arms, as outlined below. Randomization will be stratified into composite score CD13 1+/2+versus CD13 3+.

The study is divided into 2 parts to be performed in sequence:

Phase II Part:
Before the randomized phase III part of the study, there is a phase II safety cohort of 6 patients obtaining at least 3 cycles each of the combination outlined in arm 2 (see below, 1.5 mg/m$^2$ Trabectedin plus 3 mg/m$^2$ tTF-NGR) to confirm safety of this combination. In case of dose-limiting toxicity (DLT) in this phase II cohort, a dose-modification protocol for tTF-NGR to 2 mg/m$^2$ is planned, and in case of further tolerability problems further deescalations in 0.5 mg/m$^2$ steps of tTF-NGR are planned. The safe dose is then transferred to the randomized phase III of the study. The final dose of tTF-NGR established as safe in this combination has to be applied to 6 patients with 3 cycles each. The randomized (phase III) part of the study will be opened after judgement of the safety in the phase II cohort by the DSMB.

Phase III Part:
In the phase III part of this study 120 patients are randomized 1:1 to two different groups. Primary objective is assessment of efficacy of tTF-NGR in combination with Trabectedin measured as median progression-free survival in combination treatment group (Arm 2) versus Trabectedin monotherapy (Arm 1).
ARM 1: Patients receive 1.5 mg/m$^2$ Trabectedin as a 24-hour central intravenous (iv) infusion on day 1, q d 22 x until disease progression or contraindications of further application (premedication according to institutional guidelines: e.g. 20 mg dexamethasone)
ARM 2: Patients receive standard Trabectedin according to arm 1 plus 3 mg/m$^2$ tTF-NGR (1-hour rate-controlled infusion, PORT central venous access, 100 mL NaCl) per day for 4 consecutive days following each Trabectedin cycle (≤1 hour interval between the end of Trabectedin infusion and tTF-NGR: e.g.: Trabectedin on Monday 8 am to Tuesday 8 am followed by tTF-NGR on Tuesday 9 am and on the following days (last tTF-NGR on Friday), q d 22 x until disease progression or contraindications against further application.

As the evaluation of the study results is intention-to-treat based, all patients after randomization are part of the efficacy population as evaluated by central iRECIST evaluation after end of study.

Therapy in both arms can be given on an out-patient basis. Some patients may require a hospitalization for the 24 hours of Trabectedin infusion. All patients receive best supportive care (BSC) according to institutional guidelines.

Anti-cancer activity is assessed clinically at week 9 and clinically and by imaging at week 15, and then every 9 weeks (adjusted to cycle length of 3 weeks) until week 51 and every 3 months thereafter. Decision on application of next cycle at week 9 is clinical. Imaging and clinical-based decision follow starting at week 15. This procedure is described in detail below. Median PFS, PFS rates (iRECIST) and DCR at 15, 24, 33, 42, and 51 (i.e., every 9 weeks or after 3 cycles adjusted to cycle length of 3 weeks), and in 3-months intervals thereafter, mOS, OS rate at 12 and 18 months and ORR are calculated.

3.2 Safety Assessment

Safety assessment is performed on an ongoing basis during study participation, including standard laboratory assessments. The incidence of AEs will be summarized by severity in all patients with at least one study drug intake.

Patients are treated in repeated cycles until one of the following criteria are met (in the absence of any other withdrawal criteria):
1) unacceptable toxicity precluding further therapy,
2) disease progression (as described below),
3) the patient or the investigator requests treatment discontinuation.

Patients who stop study treatment in the absence of progressive disease should not receive further line cancer therapies before their disease progresses, unless there are clear reasons to continue with alternative therapies.

The application of the next therapy cycle can be postponed for up to 21 days due to the following reasons:
1) due to patient's clinical conditions or
2) by the decision of the investigator after discussion with the Principal Investigator Prof. Schliemann.

Detailed follow-up visits after start of therapy are performed at weeks 9 and 15, followed by every 9 weeks (adjusted to cycle length of 3 weeks) until week 51, and with 3-monthly intervals thereafter.

3.3 Assessment of the Anti-Cancer Activity of the Combination of tTF-NGR and Trabectedin The study uses a modification of iRECIST for determination of progression and PFS in analogy to studies with checkpoint inhibitors (Seymour L, Lancet Oncol. 2017). Final iRECIST judgement and comparison of PFS between both arms are made after the end of study in a blinded fashion by an independent imaging core lab at the Dept. of Radiology, LMU, Munich (Prof. M. Wildgruber). Ad hoc iRECIST judgement for determination of a safe EOT for individual patients is done by the local investigators in the local study centers.

Anti-cancer activity (iRECIST modification) is assessed (clinically and imaging) at week 9 and 15, followed every 9 weeks (adjusted to cycle length of 3 weeks) until week 51 and every 3 months thereafter.

Overall Response is assessed in analogy to RECIST criteria version vs 1.1:

Complete Response (CR): Disappearance of all target lesions. Any pathological lymph nodes (whether target or non-target) must have reduction in short axis to <10 mm.

Partial Response (PR): At least a 30% decrease in the sum of diameters of target lesions, using the baseline sum of diameters as reference.

Progressive Disease (PD): At least a 20% increase in the sum of diameters of target lesions, using the smallest sum in the study as reference (this includes the baseline sum if that is the smallest in the study). In addition to the relative increase of 20%, the sum must also demonstrate an absolute increase of at least 5 mm.

Stable Disease (SD): Neither sufficient shrinkage to qualify for PR nor sufficient increase to qualify for PD, using the smallest sum diameters as reference in the study.

Lymph nodes identified as target lesions should always have the actual short axis measurement recorded (measured in the same anatomical plane as the baseline examination), even if the nodes regress to below 10 mm in the study. This means that when lymph nodes are included as target lesions, the 'sum' of lesions may not be zero even if CR criteria are met, since a normal lymph node is defined as having a short axis of <10 mm. CRFs or other data collection methods may therefore be designed to have target nodal lesions recorded in a separate section where, in order to qualify for CR, each node must achieve a short axis<10 mm. For PR, SD and PD, the actual short axis measurement of the nodes is to be included in the sum of target lesions.

3.4 Assessment of Median Progression-Free Survival (mPFS) and Progression-Free Survival Rates The PFS time is assessed for all randomized subjects. The duration is defined beginning from randomization to progression or death from any cause. The median PFS (mPFS) is calculated. The PFS rate according to iRECIST is assessed at week 15 (after 5 cycles), then at weeks 24, 33, 42, and 51 (i.e., every 9 weeks or after 3 cycles adjusted to cycle length of 3 weeks) and in 3-month intervals thereafter.

3.5 Assessment of Median Overall Survival (mOS) and Overall Survival Rates

The OS time is assessed for all randomized patients. The duration is defined beginning from randomization to death from any cause. The median OS time and the OS rate at 12 and 18 months are calculated. Thereafter the survival of the patients is monitored during 3-monthly regular follow-up visits.

REFERENCES

Denekamp and Hobson, Endothelial-Cell proliferation in experimental tumours, Br.J.Cancer(1982)46,711

De Santis R, Marrari A, Marchetti S, Mussi C, Balzarini L, Lutman F R, Daolio P, Bastoni S, Bertuzzi A F, Quagliuolo V, Santoro A: Efficacy of trabectedin in advanced soft tissue sarcoma: beyond lipo- and leiomyosarcoma. Drug Design, Develop. and Therapy 9: 5785-5791, 2015

Kessler T, Baumeier A, Brand C, Grau M, Angenendt L, Harrach S, Stalmann U, Schmidt L H, Gosheger G, Hardes J, Andreou D, Dreischalück J, Lenz G, Wardelmann E, Mesters R M, Schwöppe C, Berdel W E*, Hartmann W*, Schliemann C*: Aminopeptidase N (CD13): expression, prognostic impact, and use as therapeutic target for tissue factor induced tumor vascular infarction in soft tissue sarcoma. Translational Oncol. 11 (6): 1271-1282, 2018

Guzman-Rojas et al., Cooperative effects of aminopeptidase N (CD13)expressed by nonmalignant and cancer cells within the tumor microenvironment, PNAS Jan. 31, 2012 109 (5) 1637-1642

Huang et al., Tumor Infarction in Mice by Antibody-Directed Targeting of Tissue Factor to Tumor Vasculature Science 24 Jan. 1997: Vol. 275, Issue 5299, pp. 547-550

Pasqualini et al., Aminopeptidase N is a Receptor for Tumor-homing Peptides and a Target for Inhibiting Angiogenesis, CANCER RESEARCH 60, 722-727, Feb. 1, 2000

The invention claimed is:

1. A method of treating cancer in an individual, wherein the treatment comprises the following steps:
   (a) administering to the individual an effective amount of a composition comprising Trabectedin, and
   (b) subsequently administering to the individual an effective amount of a composition comprising a tTF-NGR protein.

2. The method of claim 1, wherein the cancer is a soft-tissue sarcoma.

3. The method of claim 2, wherein the soft-tissue sarcoma is selected from the group consisting of: dedifferentiated liposarcoma, myxoid liposarcoma, pleomorphic liposarcoma, adult fibrosarcoma, myxofibrosarcoma, leiomyosarcoma, rhabdomyosarcoma, angiosarcoma, synovial sarcoma, and undifferentiated sarcoma.

4. The method of claim 2, wherein the soft-tissue sarcoma of the individual is inoperable, metastatic or refractory.

5. The method of claim 1, wherein the composition comprising Trabectedin and the composition comprising tTF-NGR are administered to the individual via intravenous infusion.

6. The method of claim 1, wherein the composition comprising Trabectedin is administered to the individual via a 24-hour intravenous infusion.

7. The method of claim 1, wherein Trabectedin is administered at a dose of 1.5 mg/m$^2$.

8. The method of claim 1, wherein the tTF-NGR protein comprises or has the sequence of SEQ ID NO: 2.

9. The method of claim 1, wherein the administering of the tTF-NGR protein is started between 1 minute and 1 hour after the end of the administration of Trabectedin.

10. The method of claim 1, wherein tTF-NGR protein is administered to the individual via a 1-hour intravenous infusion.

11. The method of claim 1, wherein the administration of the tTF-NGR protein is repeated once per day for the next 4 consecutive days.

12. The method of claim 1, wherein the tTF-NGR protein is administered at a dose of 3 mg/m$^2$/day.

13. The method of claim 1, wherein the tTF-NGR protein is administered in a 0.9% NaCl solution in a total infusion volume of 100 ml.

14. The method of claim 1, wherein the tTF-NGR protein is infused via a central venous port access.

\* \* \* \* \*